(12) United States Patent
Veitsel et al.

(10) Patent No.: US 8,818,720 B2
(45) Date of Patent: Aug. 26, 2014

(54) METHOD AND APPARATUS OF GNSS RECEIVER HEADING DETERMINATION

(75) Inventors: Vladimir V. Veitsel, Moscow (RU); Dmitry P. Nikitin, Moscow (RU); Andrey V. Plenkin, Kashira (RU); Andrey V. Veitsel, Moscow (RU); Mark I. Zhodzishsky, Moscow (RU); Victor A. Prasolov, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 101 days.

(21) Appl. No.: 13/383,807

(22) PCT Filed: Jun. 28, 2011

(86) PCT No.: PCT/RU2011/000463
§ 371 (c)(1),
(2), (4) Date: Dec. 17, 2012

(87) PCT Pub. No.: WO2013/002663
PCT Pub. Date: Jan. 3, 2013

(65) Prior Publication Data
US 2013/0076564 A1    Mar. 28, 2013

(51) Int. Cl.
*G01C 21/12* (2006.01)
*G01S 19/52* (2010.01)

(52) U.S. Cl.
CPC ................................. *G01S 19/52* (2013.01)
USPC ................................. 701/495; 342/357.35

(58) Field of Classification Search
None
See application file for complete search history.

(56) References Cited

U.S. PATENT DOCUMENTS

| 7,193,559 | B2 | 3/2007 | Ford et al. |
| 7,817,087 | B2 * | 10/2010 | Cohen et al. ............. 342/357.25 |
| 2008/0208454 | A1 * | 8/2008 | Pesterev et al. ............... 701/206 |
| 2009/0135057 | A1 * | 5/2009 | Vollath et al. ............ 342/357.03 |
| 2010/0019963 | A1 | 1/2010 | Gao et al. |

FOREIGN PATENT DOCUMENTS

| RU | 2275650 | 4/2006 | |
| RU | 2386142 | 7/2009 | |
| WO | WO 2008033785 | 3/2008 | |
| WO | WO 2008033785 A2 * | 3/2008 | ............... G01S 1/00 |
| WO | WO 2008033785 A3 * | 7/2008 | |

\* cited by examiner

*Primary Examiner* — Helal A Algahaim
*Assistant Examiner* — Kelly E Darby
(74) *Attorney, Agent, or Firm* — Bardmesser Law Group

(57) ABSTRACT

The present invention relates to processing information generated by GNSS receivers received signals such as GPS, GLONASS, etc. GNSS receivers can determine their position in space. The receivers are capable of determining both coordinates and velocity of their spatial movement. When a receiver is used in any machine control systems, velocity vector heading (in other words, velocity vector orientation) should be determined along with velocity vector's absolute value. Angle, determining velocity vector orientation, is calculated based on velocity vector projections which are computed in navigation receivers. The accuracy of velocity vector orientation calculated based on velocity vector projections strongly enough depends on velocity vector's absolute value. To enhance the accuracy, a method of smoothing primary estimates of velocity vector orientation angles using a modified Kalman filter has been proposed. The bandwidth of this filter is varied depending on current estimates of velocity vector's absolute value which were calculated based on the same velocity vector projections.

21 Claims, 4 Drawing Sheets

METHOD AND APPARATUS OF GNSS RECEIVER HEADING DETERMINATION

BACKGROUND OF THE INVENTION

Navigation receivers capable of positioning with the help of GNSS signals, such as GPS, GLONASS etc., are widely used today. The receivers are employed both in geodetic operations and for automatic, semi-automatic and information support in various machine control systems. For such applications, the navigation receiver has to provide not only a current coordinate estimates, but also estimates of velocity.

Navigation receiver receives and processes signals transmitted by GNSS satellites within a line-of-sight. Satellite signals are modulated by a pseudo-random binary code which is used to measure delays of the received signal relative to a local reference signal. These measurements, normally called "code" measurements, enable pseudo-ranges to be determined, which are different from true ranges-to-satellites due to satellite board-user time scale discrepancy. If the number of satellites is large enough, user coordinates can be determined and time scales coordinated by processing the measured pseudo-ranges.

As soon as satellite signals are received, the receiver can measure pseudo-Doppler offsets of carrier frequency for each satellite. Second- or third-order phase-lock loops (PLLs) are used in receivers for this purpose, and measure the frequency of the received signal, along with a phase of the received signal. Since the satellite's emitted nominal frequency is known, and satellite radial velocity can be calculated by using known satellite orbit and receiver positioning results, the pseudo-Doppler carrier offset related to receiver movement can be obtained. Pseudo-Doppler carrier frequency offset is different from the true one mostly due to instability of a reference oscillator. By co-processing a large amount of satellite measurements, actual receiver velocity and inaccuracy of reference oscillator frequency can be determined. Processing of signal parameters received from all GNSS satellites in view, which enables the receiver to estimate its own coordinates and velocity, is often called the "navigation problem/task".

One common way of solving the navigation problem is the least squares method (LSM), see *Global Positioning System: Theory and Application*, edited by B. W. Parkinson, J. J. Spilker, Jr., AIAA, Inc., Washington, vol. 1, 1996. By applying this technique to pseudo-Doppler carrier offsets, estimates of receiver's velocity vector projections can be calculated.

The accuracy of estimates for velocity vector projections depend on the type and settings of a particular receiver, PDOP (position dilution of precision) values, which characterize the GNSS satellites in view, signal-to-noise ratio for received signals and satellite-to-receiver signal propagation conditions. To enhance accuracy of velocity estimations, different filter methods are applied.

U.S. Pat. No. 6,664,923, issued on Dec. 16, 2003, discusses a Kalman filter to simultaneously estimate both position and velocity vector projections using co-processing code and phase measurements in receiver for all GNSS satellites in view. An initialization stage is used to get information about covariance matrix, which is further applied to update the filter state.

U.S. Pat. No. 7,706,976, issued on Apr. 27, 2010, discusses an estimation of velocity vector projections using increments of receiver coordinates, with such coordinates to be used for calculating increments that would be different from each other by a value exceeding statistical accuracy.

Another approach to this problem is based upon integration of measurements taken from the navigation receiver and inertial sensors. Accelerometers are often used as sensors. Three accelerometers measure three acceleration axes. By integrating these accelerations at known original conditions, the three velocity vector projections can be obtained. In the process of taking integrals of accelerations, errors of measurements are, naturally, integrated as well. Variance of vector estimates obtained by accelerometer data is grows over time, and usefulness of such measurements eventually becomes smaller. Co-processing navigation receiver and inertial sensor measurements has to make their coordinate systems consistent. If off-centering of these systems is constant and fixed by a rigid enough design of the device, then angular rotation of one system relative to another remains unknown and should be determined from measurement results.

There are different ways of integration. U.S. Pat. No. 7,193,559, issued on Mar. 20, 2007, for example, discusses a Kalman filter that co-processes a set of code and carrier phase receiver measurements from all GNSS satellites in view, as well as data from additional inertial sensors, thereby estimating receiver position and velocity vector projections.

Generally, each references refer to determining Cartesian coordinate projection and receiver velocity vector projection in a geocentric coordinate system.

Kuzmin, S. Z., *Digital processing of radio location information*, Moscow, "Soviet Radio", 1967 (in Russian) (pages 340-341) discloses an approach, including the determination velocity vector modulus (absolute value) and velocity vector orientation angle in space first, and then separate filtering of these values. The benefits of such an approach for radiolocation include a possibility of applying a simpler mechanism of detecting a radiolocation object maneuver and independent identification of instantaneous velocity vector's absolute value changes and directional change in velocity vector. It is important that for radiolocation the measurement, accuracy of an object's moving direction does not depend on movement velocity, and selection of angle filtering parameters depends only on dynamic characteristics of the observed object.

In GNSS, velocity vector projections in the Cartesian coordinate system are primary information. The techniques of obtaining estimates of the velocity vector's absolute value and its direction are well-known. For example, to determine these values for the case of in-plane movement, let $V_E$ is the projection of velocity vector onto axis E oriented to the East, and $V_N$ is the projection of velocity vector onto axis N directed to the North. Then velocity vector's absolute value is determined by $$V = \sqrt{V_E^2 + V_N^2} \quad (1)$$

and on angle which defines its direction is as follows $$\theta = \text{arctg}\left(\frac{V_E}{V_N}\right) \quad (2)$$

Note that the inverse trigonometric function used in (2) is a periodic function, uniquely determined within an interval $$\theta \in \{-\frac{\pi}{2}, +\frac{\pi}{2}\}.$$

The user is usually interested in heading/azimuth angle $\Theta$, which is uniquely determined within interval $\Theta \in \{0, +2\pi\}$.

This angle is normally reckoned from the North in a clockwise direction. Transformation (3) is used together with (2):

$$\Theta = \begin{cases} \theta & \text{if } \langle (V_N \geq 0) \text{and}(V_E \geq 0) \rangle \\ \theta + 2\pi & \text{if } \langle (V_N \geq 0) \text{and}(V_E < 0) \rangle \\ \theta + \pi & \text{if } \langle (V_N < 0) \rangle \end{cases} \quad (3)$$

Variance of angle estimates obtained from expression (2) depends on variance of velocity vector projection estimates $V_E$ and $V_N$. If the values $V_E$ and $V_N$ are not correlated $$\sigma_\Theta^2 = \frac{1}{V^4} \cdot (V_E^2 \cdot \sigma_{V_N}^2 + V_N^2 \cdot \sigma_{V_E}^2) \quad (4)$$

Considering that $\sigma_{V_E}^2 \cong \sigma_{V_N}^2 \cong \sigma_V^2$, which is often true in practice of navigation receivers, the variance of angle estimates is as follows:

$$\sigma_\Theta^2 \cong \frac{\sigma_V^2}{V^2} \quad (5)$$

where $\sigma_V^2$ is the variance of velocity vector's absolute value estimate.

It should be noted that expressions (4) and (5) are true if $V \gg \sigma_V$. The smaller the velocity vector's absolute value is, the smaller the accuracy of angle measurements will be, and the distribution law of angle estimates tends to become equally probable within a range $\{0, 2\pi\}$, and at full stop (V=0), the notation of velocity vector direction has no meaning.

SUMMARY OF THE INVENTION

The present invention is related to methods and systems for improving GNSS accuracy and for determining velocity vector orientation angle using measurements of GNSS receiver, that substantially obviates one or several of the disadvantages of the related art.

The method includes determination of velocity vector projections as a result of processing radio signals from GNSS satellites. Statistical accuracy estimate for these projections, or a statistical estimate of velocity vector's absolute value, is assumed to be a priori known, for a particular receiver, and can be known, for example, from testing the receiver, or from device specifications, etc.

To determine an orientation angle of the velocity vector, primary estimates of the velocity vector orientation angle and primary estimates of the velocity vector's absolute value are generated using velocity vector projections, and then these primary estimates are smoothed by a modified Kalman filter. Implementation of the modified Kalman filter considers, first, cyclicity/periodicity of the filtered value and, second, accuracy changes of the primary angle estimates. Current accuracy of primary estimates of orientation angle is calculated by using primary estimates of velocity vector's absolute value. Two possible methods of determining "Stop" intervals are considered when movement direction is uncertain and filtering of orientation angle should be terminated.

Additional independent measurements of velocity vector orientation angle rate can be used for dual-frequency navigation receivers in filtering. These independent measurements can be obtained from carrier phase increments in different frequency bands. Additional measurements enable enhancing estimate accuracy of the velocity vector orientation angle at low velocity of movement and to continue filtering at full stop of the receiver.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF EMBODIMENTS OF THE INVENTION

Figure 1:
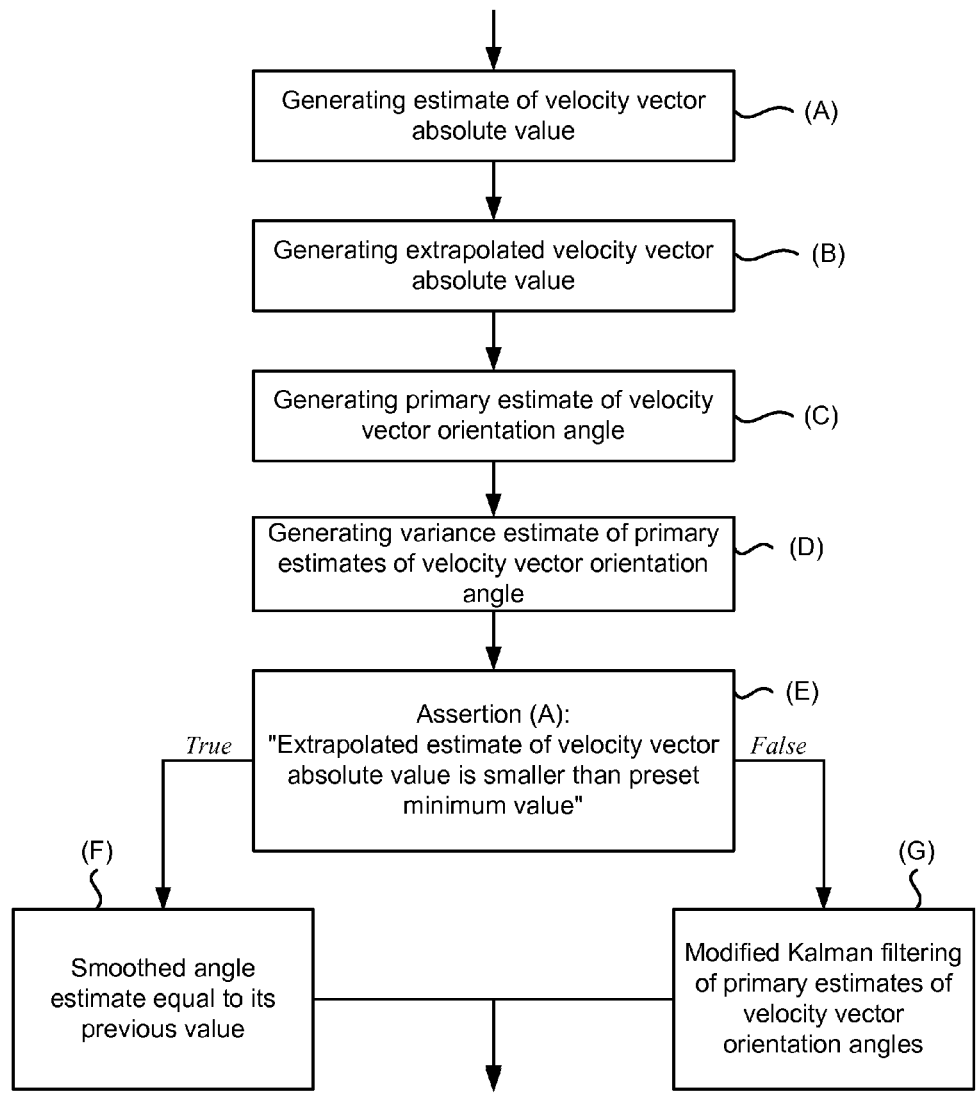
FIG. 1 shows a determination of receiver velocity vector orientation.

Reference will now be made in detail to the preferred embodiments of the present invention, examples of which are illustrated in the accompanying drawings.

Coordinate and velocity vector estimates in the geocentric coordinate system are obtained as a result of solving the navigation problem. At the same time, the user is often interested a coordinate system whose center of which is located on the Earth's surface. In this case, measured coordinates and velocity vector projections are re-calculated in accordance with the local coordinate system. Moreover, for a number of applications both in geodesy and machine control, projections are not always practical. Often, velocity vector's absolute value and angles determining this vector orientation within the local coordinate system are much more convenient.

For example, in surveying applications, the surveyor needs to find a ground point with certain coordinates. To do this, the surveyor calculates an azimuth angle for the point in question. Moving in this direction, he needs periodically to check the movement direction against the desired direction and correct his movement as needed. In automatic and semi-automatic machine control systems, a difference between measured and desired heading angles/moving directions is used to control steering mechanisms, while a difference between the measured velocity vector's absolute value and desired velocity is used to control the engine.

The present invention relates to such determination of movement direction/heading based on measurements of a GNSS receiver, when the accuracy of heading determination is somewhat dependent upon velocity vector's absolute value.

The method in question suggests that primary velocity vector's absolute value estimates and primary vector orientation angle estimates will be first generated from primary velocity vector projections, and then these primary measurements will be filtered. Unlike the approach stated in Kuzmin, S. Z., *Digital processing of radio location information*, Moscow, "Soviet Radio", 1967 (in Russian) pages 340-341, filter parameters for smoothing velocity vector orientation angle can depend upon velocity vector's absolute value estimates. Such an approach provides a desired accuracy of velocity vector orientation angle when velocity vector's absolute value varies in a wide range.

As an embodiment of the method, consider a case when the receiver generates two primary measurements of velocity vector projections: $V_{En}$ is the projection of the velocity vector onto axis E directed to the East, and $V_{Nn}$ is the projection of the velocity vector onto axis N towards the North. Hereafter, subscript n designates the number of current operation clock cycle. The order of the steps is shown in FIG. 1.

To get a primary estimate of velocity vector's absolute value $V_n$, equation (1) is used. A primary estimate of velocity orientation angle $\Theta_n$ is obtained from equations (2) and (3). Equation (4) is applied to get an accuracy estimate of the velocity vector orientation angle primary estimates using velocity vector's absolute value estimates of equation (1). (See steps (A), (B) and (C) in FIG. 1).

To obtain the desired accuracy of angle estimates independent of velocity vector's absolute value, filtering of primary angle measurements made by a modified Kalman filter is applied. The design of the filter takes into account that primary angle estimates are not equally accurate, and variance of each primary angle estimate is determined by velocity vector's absolute value estimates.

The stop condition (i.e., termination of receiver movement) at which the concept of "velocity vector direction" makes no sense, is predicted, (i.e., extrapolated) velocity vector's absolute value $V_n^{pred}$ (step (B) in FIG. 1) becomes smaller than a certain minimal value (step (E) in FIG. 1)

$$V_n^{pred} < V_{min} \quad (6)$$

Filtering of the angle stops as soon as the stop condition occurs (step (F) in FIG. 1). When the stop condition fails to occur, filtering of velocity vector resumes, the primary angle estimate is used as the first (after stop) smoothed angle estimate. Such operation logic results in noticeably reducing transition processes in the filter, which are especially great in case of backward movement of the receiver.

To extrapolate velocity vector's absolute value $V_n^{pred}$, either (a) filtering of primary estimates of velocity vector's absolute value $V_n$ is applied, enabling acceleration $\tilde{V}_n$ to be estimated and, therefore $V_n^{pred} = \tilde{V}_{n-1} + \dot{\tilde{V}}_{n-1} \cdot \tau_n$; or (b) a linear prediction of primary estimates $V_n$ is used and then (for the case, for example, $\tau_n$=const) equation $V_n^{pred} = 2 \cdot V_{n-1} - V_{n-2}$, can be applied where $V_{n-1}$ and $V_{n-2}$ are the primary estimates of the velocity vector's absolute value at n-1 and n-2 clocks cycles, respectively.

If the estimates of velocity vector projections $V_{En}$ and $V_{Nn}$ have not been previously filtered, then the stop condition can be governed by the inequality $V_n < V_{min}$. The use of $V_n^{pred}$ in (6), gives in this case practically the same result. If the estimates of velocity vector projections $V_{En}$ and $V_{Nn}$ were preliminary filtered, then, the use of $V_n^{pred}$ to detect a stop becomes needed and such a case will be considered below (see illustration of the method in FIG. 2).

The value $V_{min}$ typically depends on accuracy characteristics of the GNSS receiver. For example, if the GNSS receiver measures velocity vector projections with variances $\sigma_{V_E}^2$ and $\sigma_{V_N}^2$, then the value of minimal velocity can be selected within a range $V_{min} = (1 \ldots 3) \cdot \sqrt{\sigma_{V_E}^2 + \sigma_{V_N}^2} = (1 \ldots 3) \cdot \sigma_V$, where $\sigma_V$ is the square root of variance of absolute value of the velocity vector error.

Figure 2:
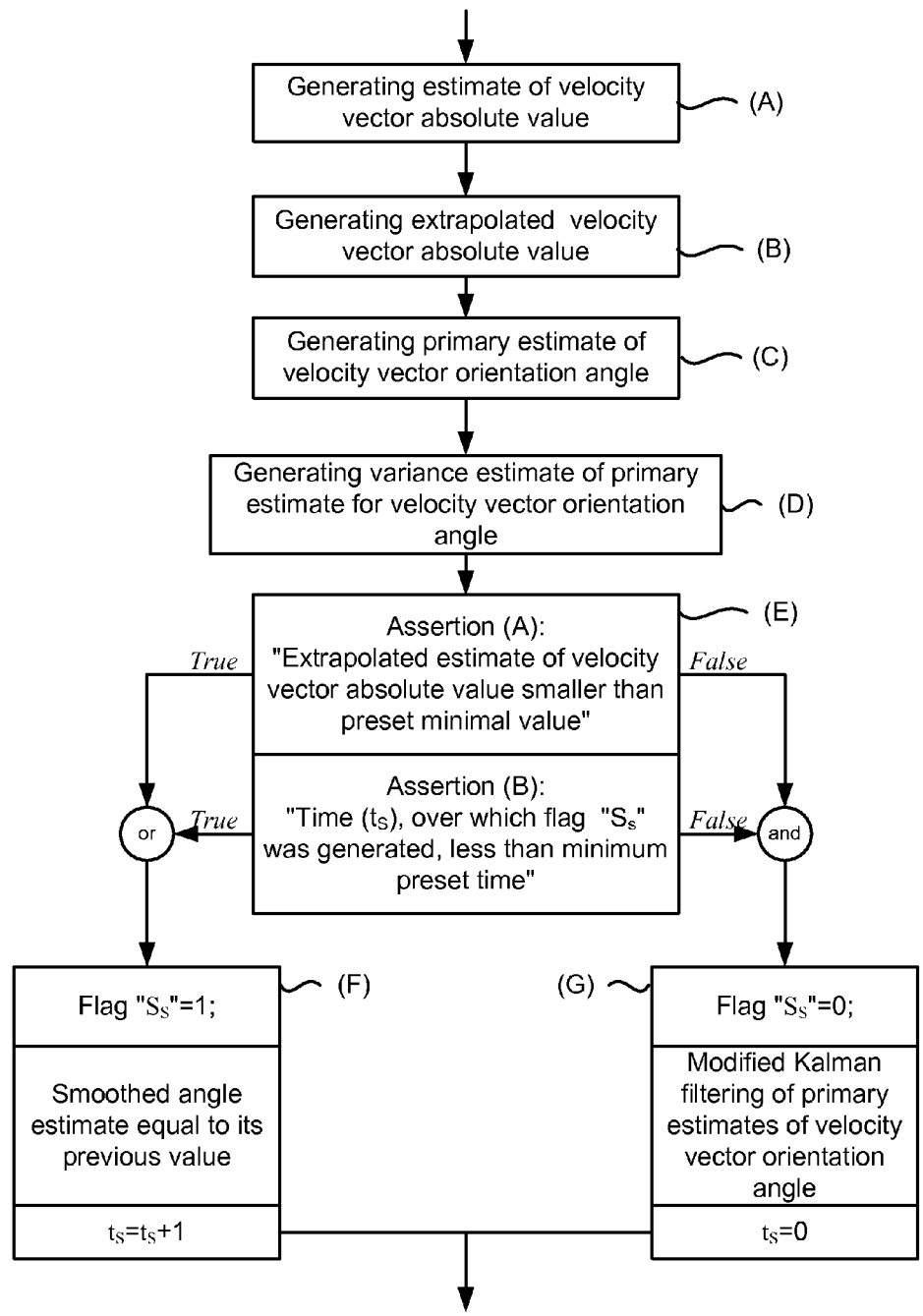
FIG. 2 shows a determination of a navigation receiver heading using smoothed estimates of velocity vector projections.

FIG. 1 and FIG. 2 show the order of actions to implement the approach described herein. However, there are a number of peculiarities that require a more detailed description given below.

Estimating Accuracy of Velocity Vector's Absolute Value

Variance of velocity vector projection estimates can be calculated in solving the navigation problem, by taking into account measurement accuracy for each satellite and GDOP (Geodetic Dilution of Precision). Estimates of velocity vector projections will be characterized by a correlation matrix whose sum of diagonal elements determines variance of velocity vector's absolute value $\sigma_V^2$.

For a number of cases (large enough number of GNSS satellites in view, low enough multipath level, lack of harsh interference, and so on), variance of velocity vector's absolute value estimates $\sigma_V^2$ can be first determined in the process of preliminary tests and, if needed, corrected at each receiver stop.

Equations of Kalman filtering

Equations of Kalman filtering are well-known, see Kuzmin, S. Z, *Design basics for systems of radio location information digital processing*, Moscow, "Radio and communications", 1986 (in Russian), page 163. In general form, they are given as follows:

$$\theta_n^{pred} = \Phi_n \cdot \tilde{\theta}_{n-1} \quad (7.1)$$

$$\Psi_n^{pred} = \Phi_n \cdot \Psi_{n-1} \cdot \Phi_n^T \quad (7.2)$$

$$K_n = \Psi_n^{pred} \cdot H_n^T \cdot (H_n \cdot \Psi_n^{pred} \cdot H_n^T + R_n)^{-1} \quad (7.3)$$

$$\tilde{\theta}_n = \theta_n^{pred} + K_n \cdot (Y_n - H_n \theta_n^{pred}) \quad (7.4)$$

$$\Psi_n = \Psi_n^{pred} - K_n \cdot H_n \cdot \Psi_n^{pred} \quad (7.5)$$

where $Y_n$ is the vector of measured parameters at the n-th clock cycle of executing the filtering algorithm; $\tilde{\theta}_n$ is the vector of estimated parameters; $\Phi_n$ is the extrapolation (prediction) matrix; $\theta_n^{pred}$ the extrapolated (predicted) value of the estimated parameters for the n-th clock cycle; $H_n$ is the connection matrix, i.e., matrix establishing relationship between measured and estimated parameters; $\Psi_n$ is the error correlation matrix for estimated parameters at the n-the clock cycle; $\Psi_n^{pred}$ the error correlation matrix for extrapolation (prediction) of estimated parameters; $K_n$ is the Kalman filter matrix gain; $R_n$ is the correlation matrix of primary measurement errors; superscript $(\ldots)^T$ means matrix transposition operation, and $(\ldots)^{-1}$ means inverse matrix calculation.

Angle Filtering

Let us consider specifics of using a Kalman filter for angle filtering.

Matrix $R_n$, the scalar equal to variance of the primary measurement of velocity vector orientation angle, can be calculated as follows:

$$R_n = \sigma_{\Theta n}^2 = \frac{\sigma_V^2}{V_n^2} \quad (8.1)$$

or $$R_n = \sigma_{\Theta n}^2 = \frac{1}{V_n^4} \cdot (V_{En}^2 \cdot \sigma_{V_N}^2 + V_{Nn}^2 \cdot \sigma_{V_E}^2) \quad (8.2)$$

where $V_n$ is the velocity vector's absolute value estimate according to equation (1).

Due to measurement errors, the velocity vector's absolute value $V_n$ can be so small that it will be impossible to perform a division operation. To eliminate such situations, the following known rule can be applied: if $|V_n|<V_{min}$, then $\sigma_{\Theta n}^2 = \sigma_{\Theta MAX}^2$. Value $\sigma_{\Theta MAX}^2$ can be almost arbitrary. The only condition should be met at selecting $$\sigma_{\Theta MAX}^2 > \frac{\sigma_V^2}{V_{min}}.$$

If a linear pattern of angle change is applied, the vector of estimated parameters $\tilde{\theta}_n$ is $$\tilde{\theta}_n = \left\| \begin{array}{c} \tilde{\Theta}_n \\ \dot{\tilde{\Theta}}_n \end{array} \right\|,$$

where $\tilde{\Theta}_n$ is the estimate of smoothed velocity vector orientation angle at the n-th clock cycle, and $\dot{\tilde{\Theta}}_n$ is the estimate of smoothed angular rate at the n-th clock cycle; connection matrix $H_n$ is in the form of $H_n = \|1\ 0\|$; extrapolation matrix $\Phi_n$ is $$\Phi_n = \left\| \begin{array}{cc} 1 & \tau_n \\ 0 & 1 \end{array} \right\|,$$

where $\tau_n$ is the time interval between the current and previous clock cycles.

Extrapolated angle in this case can be written as $$\Theta_n^{pred} = \left\| \begin{array}{c} \tilde{\Theta}_{n-1} + \tau_n \cdot \dot{\tilde{\Theta}}_{n-1} \\ \dot{\tilde{\Theta}}_{n-1} \end{array} \right\|,$$

and the expression $(Y_n - H_n \cdot \theta_n^{pred})$ in (7.4) converts to $\Delta_n = (\Theta_n - \Theta_n^{pred})$.

Modification of Kalman Filtering for Periodic/Cyclic Value

The value $\Delta_n$ is the current difference between primary measured and extrapolated values of the estimated value, which is usually called a "mismatch" or an "error signal" in filtering theory. In the present case, it is angle mismatch $\Delta_\Theta$ which is a cyclic value, and hence it should be calculated through the shortest arc, see Berezin L. V., Veitsel V. A. *Theory and design of radio systems*, Moscow, "Soviet Radio", 1977 (in Russian), page 361:

$$\Delta_{\Theta n} = \begin{cases} (\Delta_n - 2\pi) & \text{if } \langle \pi < \Delta_n < 2\pi \rangle \\ \Delta_n & \text{if } \langle -\pi < \Delta_n < \pi \rangle \\ (\Delta_n\_2\pi) & \text{if } \langle -2\pi < \Delta_n < -\pi \rangle \end{cases} \quad (9)$$

Note that primary measurements $\Theta_n$ (as a cyclic value) are determined within a range of $\Theta \in \{0, +2\pi\}$, and therefore, the smoothed $\tilde{\Theta}_n$ estimated in filtering, and the extrapolated angles $\Theta_n^{pred}$ calculated from (7.1) and (7.4), respectively, should be re-calculated within the range of:

$$\tilde{\Theta}_n \equiv \begin{cases} \tilde{\Theta}_n & \text{if } \langle 0 < \tilde{\Theta}_n < 2\pi \rangle \\ \tilde{\Theta}_n - 2\pi & \text{if } \langle \tilde{\Theta}_n > 2\pi \rangle \\ \tilde{\Theta}_n + 2\pi & \text{if } \langle \tilde{\Theta}_n < 0 \rangle \end{cases} \quad (10)$$

$$\Theta_n^{pred} \equiv \begin{cases} \Theta_n^{pred} & \text{if } \langle 0 < \Theta_n^{pred} < 2\pi \rangle \\ \Theta_n^{pred} - 2\pi & \text{if } \langle \Theta_n^{pred} > 2\pi \rangle \\ \Theta_n^{pred} + 2\pi & \text{if } \langle \Theta_n^{pred} < 0 \rangle \end{cases} \quad (11)$$

Upon completion of these operations, the values $\tilde{\Theta}_n$ and $\Theta_n^{pred}$ will be defined within $\{0, +2\pi\}$ similar to primary measurement $\Theta_n$. Operations (10) and (11) will be called "setting up the angle estimate to a given range of definition".

To ensure filter stability, an approach mentioned in Kuzmin, S. Z, *Design basics for systems of radio location information digital processing*, Moscow, "Radio and communications", 1986 (in Russian), page 167, can be used, then expression (7.2) is written as (7.2*):

$$\Psi_n^{pred} = \Phi_n \cdot (\Psi_{n-1} + \Psi_0) \cdot \Phi_n^T \quad (7.2^*)$$

where $\Psi_0$ is generally a certain positively defined matrix. In the example in question $\Psi_0$ has the form of $$\Psi_0 = \left\| \begin{array}{cc} \psi_0^{1,1} & 0 \\ 0 & \psi_0^{2,2} \end{array} \right\|,$$

where $\Psi_0^{1,1}$ and $\Psi_0^{2,2}$ are the desired (pre-assigned) values of variances of smoothed angle estimates and angle rates respectively which limit the equivalent filter memory. The use of the modified Kalman filter for smoothing the angle estimates is shown in FIGS. 1 and 2 as step (G).

Using Smoothed Estimates of Velocity Vector Projections

Sometimes, estimates of velocity vector projections, smoothed in some manner by a filter, have to be used to obtain velocity vector orientation angle. In this case, when varying the velocity vector's absolute value (slowdown or acceleration), projection estimates include the corresponding dynamic errors. Linear filtering gives dynamic error proportional to the filtered value itself. One might think that if the filters for each of projections are identical, these errors would not cause errors of the velocity vector orientation angle estimate. However, slowdown can, in fact, produce a large dynamic error in the orientation angle estimate. Indeed, at low movement velocity, both velocity vector projections can change sign and then, the primary angle estimate (2) and (3) will be opposite (i.e., will change in 180°). When dynamic error in projection estimates decreases, the angle will again change by 180°

Such sharp changes in primary angle estimates will cause transition events at filtering velocity vector orientation angles, and dynamic errors in angle estimates can become unacceptably large.

Reverse movement direction (change of 180°) is also possible, either at turns, or after a full stop, and further backward movement. To distinguish these situations from reverse change due to dynamic errors, the moment of stop is proposed to detect according to the value of extrapolated velocity vector's absolute value, i.e., under conditions stipulated by (6).

Extrapolated velocity vector's absolute value $V^{pred}$, unlike velocity vector's absolute value V, can take both positive and negative values. In accordance with this logic ($V_{min}>0$), a negative value of $V^{pred}$ will be regarded as a stop.

After a stop, movement can be initiated in a random direction, and therefore the velocity vector orientation angle is in the range $\Theta \in \{0, +2\pi\}$, irrespective of its position before the stop. To reduce transition events, filtering of angles after stop should start from the first primary angle estimate.

For some cases, the procedure described above may not be efficient enough. For example, if the velocity vector projections are smoothed by a second or third order narrow-band filter, and the receiver is sharply slowing down, the transition process will cause oscillation and die out for time T, equal to 3 . . . 5 filter time constants. In this case, satisfying condition $V^{pred} > V_{min}$ cannot be taken as a complete transition process, and meeting this condition cannot be regarded as a movement start.

To resolve this situation, two mutually exclusive states "movement" and "stop" are distinguished. The state "movement" will be associated with the flag "$S_S$"=0, and state "stop" with the flag "$S_S$"=1. Transition from one state to the other are governed by the rule:

If two conditions are met at the same time:

$$(V^{pred} > V_{min}) \text{ and } (t_s > T) \qquad (15)$$

a decision about moving the object is taken and then "$S_S$"=0, but if at least one condition is not satisfied, a decision about a stationary object is taken, and then "$S_S$"=1;

where $t_s$ is the time elapsed from the moment of detecting the stop. Value $t_s$ will be incremented by $\tau_n$ each clock cycle until "$S_S$"=1, and set to zero $t_s$=0 until "$S_S$"=0;

$\tau_n$ is the time interval between the current and previous clock cycles;

T is the time of dying out transition processes in velocity vector projections in filtering.

FIG. 2 illustrates the steps for this case. Comparison of FIG. 2 to FIG. 1 shows that when using smoothed estimates of projection of the velocity vector to determine movement direction, the steps (E), (F) and (G) need to be modified.

Using Dual-Frequency Measurements

High-accuracy professional receivers often measure carrier phases in two frequency bands, designated L1 and L2. These measurements are used in high-precision positioning. But the same measurements can be useful to get additional independent estimates of velocity vector angle rates (changes). As is well-known, GNSS satellites transmit circularly-polarized signals. Measured phase of the signals depends on the direction to a satellite (satellite line). When the antenna turns in the horizontal plane, signal phase changes in angle are equal to the turning angle. If dual-frequency measurements are available, the antenna's rotation angle can be determined from $$\Delta \theta_n^\varphi = k_2 \cdot \Delta \Phi^{L1} - k_1 \cdot \Delta \Phi^{L2} \qquad (12)$$

$$k_1 = \frac{f_{L1}}{f_{L1} - f_{L2}}; k_2 = \frac{f_{L2}}{f_{L1} - f_{L2}}$$

where $f_{L1}$ and $f_{L2}$ are nominal carrier values in the corresponding ranges;

$\Delta \Phi^{L1} = \Phi_n^{L1} - \Phi_{n-1}^{L1}$ и $\Delta \Phi^{L2} = \Phi_{n-1}^{L2}$ are the full carrier phase increments measured by the receiver on the corresponding carrier frequencies at the n-th clock cycle.

Since estimate (12) does not depend on satellite line, the antenna rotation angle rate can be determined as a weighted mean value over all satellites in view $$\dot{\Theta}_n^\varphi = \frac{1}{\tau_n} \cdot \sum_{j=1}^{N_{SV}} w_j \cdot \Delta \theta_{n,j}^\varphi \qquad (13)$$

where $N_{SV}$ is the number of GNSS satellites tracked by the receiver;

$\tau_n$ is the time interval between the current and previous clocks $$w_j = \frac{\sigma_j^2}{\sum\limits_{j=1}^{N_{SV}} \sigma_j^2}$$

is the weight of estimate (12) for the j-th satellite;

$$\sigma_j^2 = \frac{2 \cdot (k_1^2 \cdot SNR_j^{L2} + k_2^2 \cdot SNR_j^{L1})}{SNR_j^{L1} \cdot SNR_j^{L2}}$$

is the variance of estimate (12) for the j-th satellite;

$SNR_j^{L1}$ and $SNR_j^{L2}$ are signal-to-noise estimates for the j-th satellite in the L1 and L2 bands respectively.

Estimated variance (13) at each clock cycle can be calculated from expression $$\sigma_{\dot\Theta^\varphi, n}^2 = \frac{\sum\limits_{j=1}^{N_{SV}} \sigma_j^6}{\tau_n^2 \cdot \left(\sum\limits_{j=1}^{N_{SV}} \sigma_j^2\right)^2} \qquad (14)$$

Strictly speaking, estimate (13) is the antenna rotation rate rather than velocity vector rotation that is of interest. However, for most of cases, this can be regarded as the same thing, if the antenna is firmly fixed on the housing of the moving object. Estimate (13) can be then used as an independent measurement in filtering (7) velocity vector orientation angle. Then, in (7), vector of measured values $Y_n$ is $$Y_n = \left\| \begin{matrix} \Theta_n \\ \dot\Theta_n^\varphi \end{matrix} \right\|,$$

matrix $H_n$ is written in the form $$H_n = \left\| \begin{matrix} 1 & 0 \\ 0 & 1 \end{matrix} \right\|,$$

and matrix $$R_n - R_n = \left\| \begin{matrix} \sigma_\Theta^2 & 0 \\ 0 & \sigma_{\dot\Theta^\varphi}^2 \end{matrix} \right\|,$$

the other variables are the same as before. Note that taking an additional angle rate enables increasing extrapolation accuracy; the slower the receiver moves, the higher accuracy, and the accuracy of the estimates of interest becomes higher $$\tilde{\vartheta}_n = \left\| \begin{matrix} \tilde{\Theta}_n \\ \dot{\tilde{\Theta}}_n \end{matrix} \right\|.$$

In addition, when movement stops, filtering of angular velocity estimates is still going on, and, therefore, when movement resumes, the filter keeps generating smoothed velocity vector values without transition processes using the previous estimate.

Figure 3:
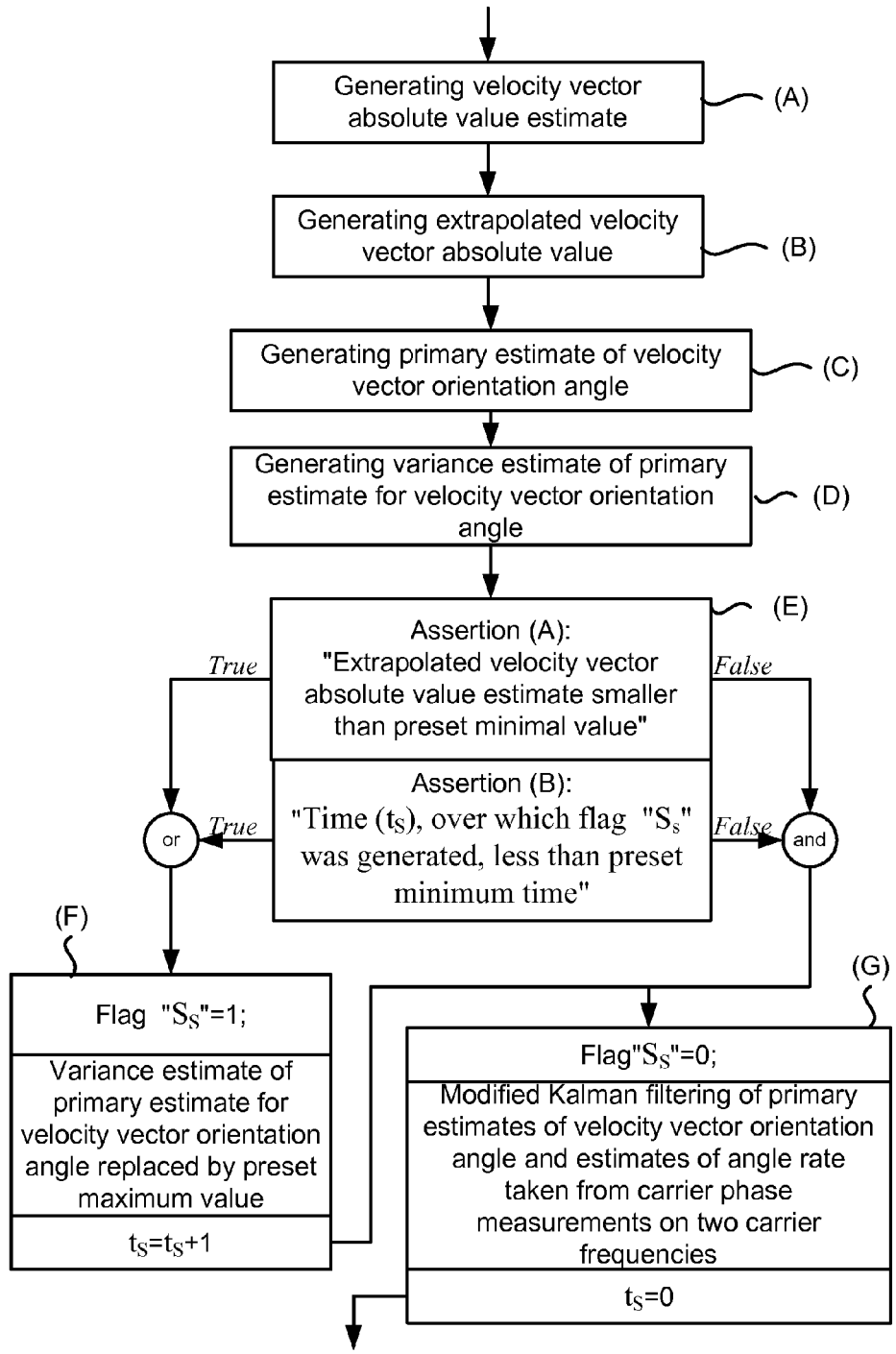
FIG. 3 shows a determination of a navigation receiver heading using smoothed velocity vector projections and angle rate estimates.

FIG. 3 shows the order of operations for this case. The modifications of the Kalman filter described above, for the case of processing two types of measurements $$Y_n = \left\| \begin{matrix} \Theta_n \\ \Theta_n^\varphi \end{matrix} \right\|$$

are reflected in FIG. 3 in the modified step (G). The option of received smoothed estimates of the angle of the movement direction even when a "stop" is detected is shown in FIG. 3 by an arrow, showing that after step (F), step (G) is performed. Also, to ensure that incorrect primary angle estimates from step (C) do not affect the results of the filtering during a "stop", the maximum possible value of $\sigma_{\Theta n}^2 = \sigma_{\Theta MAX}^2$ is used. This modification is shown in FIG. 3, step (F).

Detection of Angular Maneuver

For the sake of brevity, any change in velocity vector orientation angle different from the pre-selected model of filtering angle changes will be referred to as "angular maneuver". For example, a linear model of angle change is used for filtering velocity vector orientation $\Theta(t)=\Theta_0+\dot{\Theta}\cdot t$. During straight line movement, $\dot{\Theta}=0$, and during movement along a circle $\dot{\Theta}=\text{const}$, the selected model matches the true motion pattern, while over intervals at the beginning and at the end of turning there will be higher-order derivatives $\ddot{\Theta}$, $\dddot{\Theta}$ and so on, which naturally cause some dynamic errors in smoothed estimates.

To reduce dynamic errors due to maneuver of the receiver, there are different approaches. In Kuzmin, S. Z, *Design basics for systems of radio location informationdigital processing*, Moscow, "Radio and communications", 1986, page 170, in particular, a correlation matrix of extrapolation errors is calculated in a different way, and uses expression (7.2.1) instead of (7.2*):

$$\Psi_n^{pred} = \Phi_n \cdot (\Psi_{n-1} + \Psi_0) \cdot \Phi_n^T + G_n \cdot \Psi_\eta \cdot G_n^T \quad (7.2.1)$$

where $\Psi_\eta$ is a scalar quantity characterizing a priori knowledge about maneuver intensity as defined by $\Psi_\eta = \sigma_{\ddot{\Theta}}^2$;

$$G_n = \left\| \begin{matrix} 0.5 \cdot \tau_n^2 \\ \tau_n \end{matrix} \right\|$$

is the maneuver extrapolation matrix.

Here, $\Psi_\eta$—is a scalar quantity that characterizes a priori known information regarding intensity of the maneuver. Maneuver, here, refers to a possible difference from a real equation that governs the parameter being filtered and the accepted movement model. For example, if a linear movement model is used, and the filtered parameter can change in a random manner, then maneuver intensity can be thought of as a dispersion (variance) of a possible acceleration value. In the example described in this application, a filter is described that assumes a linear change in the angle, in other words, in the filtering process, a smoothed value of the angle and its rate of change is determined (i.e., the first derivative). In this case, the maneuver intensity is defined by $\Psi_\eta = \sigma_{\ddot{\Theta}}^2$—a dispersion (variance). The symbol $\ddot{\Theta}$ refers to the second derivative of the angle.

Therefore, a possible disturbance is taken into account by expanding the bandwidth. On the other hand, expanding the bandwidth results in greater fluctuation (noise) errors, and correct selection of $\sigma_{\ddot{\Theta}}^2$ can achieve an acceptable ratio between noise and dynamic errors at maneuvers.

To detect a maneuver, the following inequality should be checked at each clock cycle:

$$|\Delta_{\Theta n}| \cdot V_n > \pi \cdot \sigma_v \quad (16.1)$$

or in another form, $$|\Delta_{\Theta n}| > \pi \cdot \sigma_\Theta \quad (16.2)$$

If (16) is fulfilled, expression (7.2.1) should be used at the current clock cycle of filtering, otherwise—expression (7.2*). If $\pi$ in (16) is selected within a range $\pi = 3 \ldots 7$, then acceptable results can be achieved for a broad enough range of different applications.

In FIGS. 1, 2 and 3, which explain the proposed method, arrows show the order of steps to reach the desired result. The content of information at each shown step is determined at describing actions. The description given above cannot be regarded as the only embodiment of the invention and is aimed to explain the proposed approach to obtaining velocity vector heading estimates for a movable navigation receiver. Embodiments comprising a sequence of actions carried out in a different order will be considered equivalent modifications of the proposed method, for example, the sequence of generating primary estimates of velocity vector's absolute value and generating primary estimates of velocity vector orientation angles can be arbitrary. The given example of filtering with the help of the linear model applied to varying velocity vector angle rates can be further applied to other movement models.

Figure 4:
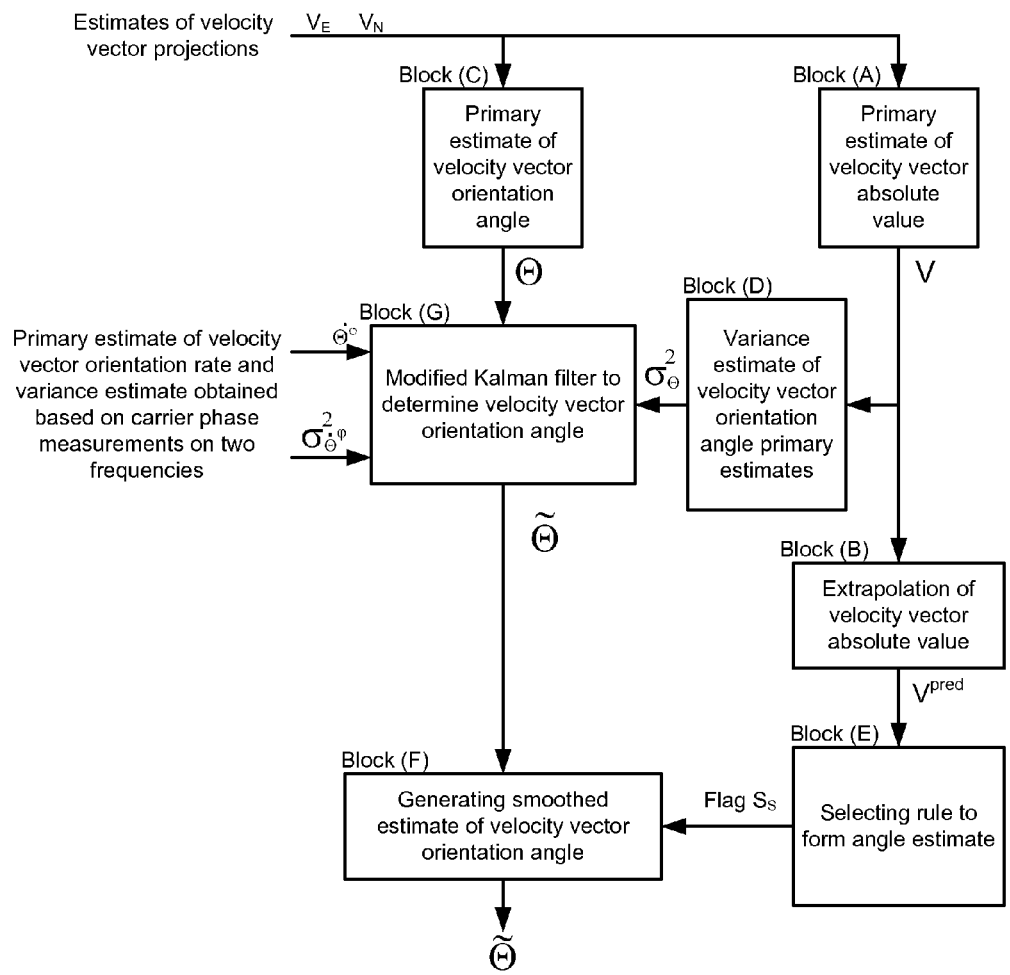
FIG. 4 shows a block-diagram of general information connections which provide determination of velocity vector heading.

FIG. 4 shows information relationships needed to perform the steps above. The content of these steps is represented in titles of function blocks. The shown division into functional blocks is not the only possible. An experienced in the art can unite blocks in a way more convenient for implementation, keeping the information relationships and functions.

Having thus described a preferred embodiment, it should be apparent to those skilled in the art that certain advantages of the described method and apparatus have been achieved. It should also be appreciated that various modifications, adaptations and alternative embodiments thereof may be made within the scope and spirit of the present invention. The invention is further defined by the following claims.

REFERENCES

1. U.S. Pat. No. 6,664,923, issued Dec. 16, 2003; Inventors: Ford et al., "Position and velocity Kalman filter for use with global navigation satellite system receivers".

2. U.S. Pat. No. 7,706,976, issued Apr. 27, 2010; Inventors: Peake; John William, "Position based velocity estimator".

3. U.S. Pat. No. 7,193,559, issued Mar. 20, 2007; Inventors: Ford, et al., "Inertial GPS navigation system with modified Kalman filter".

What is claimed is:

1. A method of determining a heading of a GNSS receiver comprising, at each clock cycle:
   (A) using a processor, generating a primary estimate of velocity vector's absolute value using current estimates of velocity vector projections;
   (B) generating an extrapolated velocity vector's absolute value using previous estimates of the velocity vector's absolute value obtained at step (A);
   (C) generating a primary estimate of a velocity vector orientation angle determined in a range of either [0 . . . $2\pi$] or [$-\pi$ . . . $+\pi$] using the current estimates of the velocity vector projections;
   (D) generating a variance estimate of the primary estimate of the velocity vector orientation angle as follows:
   (i) if the primary estimate of the velocity vector's absolute value at step (A) is smaller than a preset minimum value, a variance estimate of the primary velocity vector orientation angle equals a preset maximum value, and
   (ii) otherwise, a variance estimate of the primary velocity vector orientation angle is calculated as a ratio of a preset variance estimate of the velocity vector's absolute value to a square of the primary estimate of the velocity vector's absolute value generated at step (A);
   (E) if the extrapolated estimate of the velocity vector's absolute value generated at step (B) is greater than the preset minimum value, then performing step (G), otherwise, performing step (F);
   (F) setting a next smoothed estimate of the velocity vector orientation angle equal to its previous value; and
   (G) generating a smoothed estimate of the velocity vector orientation angle based on non-linear recurrent filtering of the primary estimate of the orientation angle obtained at step (C), wherein filter parameters, at every clock cycle, are based on the variance estimate from step (D).

2. The method of claim 1, wherein the steps (E), (F) and (G) are modified to determine the velocity vector orientation angle using a preliminarily smoothed estimate of the velocity vector projections, as follows:
   at step (E), if both (a) the extrapolated estimate of the velocity vector's absolute value generated at step (B) more than a preset minimum value of a velocity of the GNSS receiver and (b) a timer determines if a duration of an assumed stop is longer than a preset minimum duration, then step (G) is performed, otherwise, step (F) is performed,
   at step (F), incrementing the timer;
   at step (G), setting the timer to zero.

3. The method of claim 1, wherein the non-linear recurrent filtering at step (G) uses a modified Kalman filter for providing a filtering of a cyclic value and further comprising, at each clock cycle:
   (1) setting a range for the smoothed estimate of the velocity vector orientation angle to a range of the primary estimate for the velocity vector orientation angle, if the smoothed angle estimate is outside the range selected at step (C);
   (2) setting a range for the extrapolated angle estimate to the range of the primary estimate for the velocity vector orientation angle, if the extrapolated estimate is outside the range selected at step (C); and
   (3) setting an error signal as a shortest angular distance between the primary estimate of the velocity vector orientation angle and the extrapolated estimate of the velocity vector orientation angle.

4. The method of claim 3, wherein, the modified Kalman filter simultaneously processes the primary estimate of the velocity vector orientation angle and a primary estimate of angle rate obtained using carrier phase measurements of the GNSS receiver in at least two frequency bands, and whose variance estimate is determined based on accuracy of the GNSS receiver's carrier phase measurements.

5. The method of claim 3, wherein, in the modified Kalman filter, a correction matrix is added to a calculated value of an extrapolation error correlation matrix;
   wherein values of the correction matrix are calculated based on a preset intensity of a probable maneuver of the velocity vector orientation angle; and
   wherein the correction matrix is added only at such clock cycles when an absolute value of the error signal is greater than a square root of the variance of the primary estimate of the velocity vector orientation angle of step (D) by at least a factor of 3 to 7.

6. The method of claim 1, wherein, at step (B), the extrapolated velocity vector's absolute value is determined based on the primary estimate of the velocity vector's absolute value of step (A) at two previous clock cycles.

7. The method of claim 1, wherein, at step (B), the extrapolated velocity vector's absolute value is determined based on an estimate of a rate of change of the absolute value of the velocity vector, which is generated by smoothing the primary estimate of the velocity vector's absolute value of step (A).

8. A GNSS receiver apparatus :
   a processor configured to perform the following operations:
   (A) generating a primary estimate of an absolute value of a velocity vector using current estimates of velocity vector projections;
   (B) generating an extrapolated absolute value of the velocity vector using previous estimates of the absolute value of the velocity vector obtained at step (A);
   (C) generating a primary estimate of a velocity vector orientation angle determined in a range of either [0 . . . $2\pi$] or [$-\pi$ . . . $+\pi$] using current estimates of velocity vector projections;
   (D) generating a variance estimate of the primary estimate of the velocity vector orientation angle as follows:
   (i) if the primary estimate of the absolute value of the velocity vector at step (A) is smaller than a preset minimum value, a variance estimate of the primary velocity vector orientation angle equals a preset maximum value, and
   (ii) otherwise, a variance estimate of the primary estimate of the velocity vector orientation angle calculated as a ratio of a preset variance estimate of the velocity vector's absolute value to a square of primary estimate of velocity vector's absolute value generated at step (A);
   (E) if the extrapolated estimate of the absolute value of the velocity vector generated at step (B) is greater than a preset minimum value, then performing step (G), otherwise, performing step (F);
   (F) setting a next smoothed estimate of the velocity vector orientation angle equal to its previous value; and
   (G) generating a smoothed estimate of the velocity vector orientation angle based on non-linear recurrent filtering of the primary estimate of the orientation angle obtained at step (C), wherein filter parameters, at every clock cycle, are based on the variance estimate from step (D).

9. The apparatus of claim 8, wherein the steps (E), (F) and (G) are modified to determine the velocity vector orientation angle using preliminarily smoothed estimate of velocity vector projections, as follows:
   wherein, at step (E), if both (a) the extrapolated estimate of velocity vector's absolute value generated at step (B)

more than a preset minimum value of velocity and (b) a timer determines if a duration of an assumed stop is longer than a preset minimum duration, then step (G) is performed, otherwise, step (F) is performed, at step (F), incrementing the timer; and at step (G), setting the timer to zero.

10. The apparatus of claim 8, further comprising a modified Kalman filter as the non-linear recurrent filtering for providing a filtering of a cyclic value, the apparatus further performing, at each clock cycle:

(1) setting a range for the smoothed angle estimate to a range of the primary estimate for the velocity vector orientation angle, if the smoothed angle estimate is outside the range selected at step (C);

(2) setting a range for the extrapolated angle estimate to the range of the primary estimate for the velocity vector orientation angle, if the extrapolated estimate is outside the range selected at step (C); and (3) setting an error signal as a shortest angular distance between the primary estimate of the velocity vector orientation angle and the extrapolated estimate of the velocity vector orientation angle.

11. The apparatus of claim 10, wherein, the modified Kalman filter simultaneously processes the primary estimate of the velocity vector orientation angle and primary estimates of angle rate obtained using carrier phase measurements of the GNSS receiver in at least two frequency bands, and whose variance estimate is determined based on accuracy of the GNSS receiver's carrier phase measurements.

12. The apparatus of claim 10, wherein, in the modified Kalman filter, a correction matrix is added to a calculated value of an extrapolation error correlation matrix;

wherein values of the correction matrix are calculated based on a preset intensity of a probable maneuver of the velocity vector orientation angle; and wherein the correction matrix is added only at such clock cycles when an absolute value of the error signal is greater than a square root of the variance of the primary estimate of the velocity vector orientation angle of step (D) by at least a factor of 3 to 7.

13. The apparatus of claim 8, wherein, at step (B), the extrapolated velocity vector's absolute value is determined based on the primary estimate of the absolute value of the velocity vector of step (A) at two previous clock cycles.

14. The apparatus of claim 8, wherein, at step (B), the extrapolated absolute value of the velocity vector's is determined based on an estimate of a rate of change of the absolute value of the velocity vector, which is generated by smoothing the primary estimate of the absolute value of the velocity vector of step (A).

15. A method of determining a heading of a GNSS receiver comprising, at each clock cycle n:

(A) using a processor, generating primary estimates of a velocity vector's $v_n$ absolute value using current estimates of velocity vector projections $V_E$ and $V_N$, as follows:

$$V = \sqrt{V_E^2 + V_N^2};$$

(B) generating an extrapolated velocity vector's absolute value $V^{pred}$ using $V_n$ from step (A) from a second previous, or earlier, clock cycle;

(C) generating a primary estimate of a velocity vector orientation angle $\Theta$ as follows:

$$\Theta = arctg\left(\frac{V_E}{V_N}\right),$$

where $\Theta$ is in a range $[0...2\pi]$;

(D) generating a variance estimate $\sigma_\Theta^2$ of $\Theta$ as follows:

$$\sigma_\Theta^2 = \begin{cases} \sigma_{\Theta MAX}^2 & \text{if } \langle V_n < V_{min} \rangle \\ \frac{\sigma_V^2}{V_n^2} & \text{if } \langle V_n \geq V_{min} \rangle, \end{cases}$$

where $\sigma_{\Theta MAX}^2$, $\sigma_V^2$, $V_{min}$ are preset values, and $V_n$ is obtained at step (A);

(E) if $V^{pred} > V_{min}$, then performing step (G), otherwise performing step (F), using $V^{pred}$;

(F) setting a next smoothed estimate of the velocity vector orientation angle $\tilde{\Theta}_n$ equal to its previous value $\tilde{\Theta}_{n-1}$: $\tilde{\Theta}_n = \tilde{\Theta}_{n-1}$;

(G) generating a smoothed estimate of $\tilde{\Theta}_n$ by Kalman filtering adapted to filter the primary estimate of $\Theta_n$ obtained at step (C) and using $\sigma_\Theta^2$ from step (D), as follows:

$$\theta_n^{pred} = F_2[\Phi_n \cdot \tilde{\theta}_{n-1}],$$

$$\Psi_n^{pred} = \Phi_n \cdot (\Psi_{n-1} + \Psi_0) \cdot \Phi_n^T,$$

$$K_n = \Psi_n^{pred} \cdot H_n^T \cdot (H_n \cdot \Psi_n^{pred} \cdot H_n^T + R_n)^{-1},$$

$$\tilde{\theta}_n = F_2[\theta_n^{pred} + K_n \cdot F_1[Y_n - H_n \cdot \theta_n^{pred}]],$$

$$\Psi_n = \Psi_n^{pred} - K_n \cdot H_n \cdot \Psi_n^{pred},$$

where $Y_n = \Theta_n$ is the primary estimate of the velocity vector orientation angle $\Theta$ from step (C), $R_n = \sigma_{\Theta n}^2$ is the variance estimate from step (D), $\theta_n^{pred}$ is the extrapolated estimate, $\tilde{\theta}$ to is the smoothed estimate, $F_1[...]$ and $F_2[...]$ are nonlinear transformations to modify Kalman filter for filtering cyclic values, $\Psi_0$ is a preset value of a parameter limiting a bandwidth of the Kalman filter, matrix $\Phi_n$ is based on a chosen model of angle change, matrix $H_n$ is based on a chosen filter order.

16. The method of claim 15, wherein the steps (E), (F) and (G) are modified to determine $\Theta$ using a preliminarily smoothed $V_E = \tilde{V}_E$ and $V_N = \tilde{V}_N$:

wherein, in step (E), if both $V^{pred} > V_{min}$ and $t_s > T$ then step (G) is performed, otherwise, step (F) is performed, where $t_s$ is a timer of a duration of a presumed stop, T is a preset minimum time value;

wherein step (F) further comprises incrementing the timer $t_s = t_s + 1$; and at step (G), $t_s = 0$.

17. The method of claim 15, wherein the Kalman filter at step (G) provides a filtering of a cyclic value and comprises:

(1) setting a range for $\tilde{\Theta}_n$ to a range of $\Theta_n$, selected at step (C) by using a transformation $F_2[...]$ wherein $$\tilde{\Theta}_n \equiv \begin{cases} \tilde{\Theta}_n & \text{if } \langle 0 < \tilde{\Theta}_n < 2\pi \rangle \\ \tilde{\Theta}_n - 2\pi & \text{if } \langle \tilde{\Theta}_n > 2\pi \rangle \\ \tilde{\Theta}_n + 2\pi & \text{if } \langle \tilde{\Theta}_n < 0 \rangle; \end{cases}$$

(2) setting a range for $\Theta_n^{pred}$ to the range of $\Theta_n$, selected at step (C) by using a transformation $F_2[\ldots]$, where $$\Theta_n^{pred} \equiv \begin{cases} \Theta_n^{pred} & \text{if } \langle 0 < \Theta_n^{pred} < 2\pi \rangle \\ \Theta_n^{pred} - 2\pi & \text{if } \langle \Theta_n^{pred} > 2\pi \rangle \\ \Theta_n^{pred} + 2\pi & \text{if } \langle \Theta_n^{pred} < 0 \rangle; \end{cases}$$

and (3) generating an error signal $\Delta_{\Theta n} = F_1[Y_n - H_n \cdot \theta_n^{pred}]$ as a shortest arc difference between $\Theta_n$ and $\Theta_n^{pred}$, where transformations $F_1[\Delta_n]$ are $$\Delta_{\Theta n} = \begin{cases} (\Delta_n - 2\pi) & \text{if } \langle \pi < \Delta_n < 2\pi \rangle \\ \Delta_n & \text{if } \langle -\pi < \Delta_n < \pi \rangle \\ (\Delta_n + 2\pi) & \text{if } \langle -2\pi < \Delta_n < -\pi \rangle, \end{cases}$$

where $\Delta_n = \Theta_n - \Theta_n^{pred}$ is a range of $\Delta_{\Theta n}$, selected at step (C).

18. The method of claim 17, wherein, the filter simultaneously processes $\Theta_n$ and primary estimates of angle rate $\dot{\Theta}_m^\Phi$ obtained using carrier phase measurements $\Phi_n^{L1}, \Phi_n^{L2}$ of the GNSS receiver in at least two frequency bands L1, L2, and whose variance estimate $\sigma_{\dot{\Theta}^\phi}^2$, is determined based on accuracy of the GNSS receiver's carrier phase measurements, and wherein filter matrices $Y_n$, $R_n$, are in the form of $$Y_n = \begin{Vmatrix} \Theta_n \\ \dot{\Theta}_n^\varphi \end{Vmatrix}, R_n = \begin{Vmatrix} \sigma_\Theta^2 & 0 \\ 0 & \sigma_{\dot{\Theta}^\varphi}^2 \end{Vmatrix},$$

wherein for estimate of $\dot{\Theta}_n^\Phi$, angle increase on each clock cycle $\tau$ are $$\Delta\theta_n^\varphi = \frac{f_{L2}}{f_{L1} - f_{L2}} \cdot \Delta\phi_n^{L1} - \frac{f_{L1}}{f_{L1} - f_{L2}} \cdot \Delta\phi_n^{L2},$$

where, $f_{L1}$ and $f_{L2}$ are nominal carrier values in corresponding ranges of the GNSS receiver, $\Delta\phi_n^{L1} = \phi_n^{L1} - \phi_{n-1}^{L1}$ and $\Delta\phi_n^{L2} = \phi_n^{L2} - \phi_{n-1}^{L2}$ are the full carrier phase increments measured by the GNSS receiver on corresponding carrier frequencies at each clock cycle, and where for estimate of $\sigma_{\dot{\Theta}^\phi,n}^2$, signal-to-noise estimates $SNR_{j,n}^{L1}$ and $SNR_{j,n}^{L2}$ are used after being obtained for the j-th satellite in the L1 and L2 bands respectively.

19. The method of claim 17, wherein, in the modified Kalman filter, a correction matrix $\{G_n \cdot \Psi_\eta \cdot G_n^T\}$ is added to the calculated value of extrapolation error correlation matrix $\Psi_n^{pred}$, wherein values of the corrections are calculated based on a preset intensity of the probable maneuver of velocity vector orientation angle $\Psi_\eta = \sigma_{\dot{\Theta}}^2$, wherein the correction matrix $\{G_n \cdot \Psi_\eta \cdot G_n^T\}$ is added only at such clock cycles of filtering operation when $|\Delta_{\Theta n}|$ is greater than a standard deviation $\sigma_{\Theta_n}$ by at least a factor of 3 to 7, $$\Psi_n^{pred} = \begin{cases} \Psi_n^{pred} + G_n \cdot \Psi_\eta \cdot G_n^T & \text{if } \langle |\Delta_{\Theta n}| > \Pi \cdot \sigma_{\Theta n} \rangle \\ \Psi_n^{pred} & \text{if } \langle |\Delta_{\Theta n}| \leq \Pi \cdot \sigma_{\Theta n} \rangle, \end{cases}$$

where $\pi = 3 \ldots 7$, and where matrix $G_n$ is based on a chosen model of angle change.

20. The method of claim 15, wherein, in step (B), $V_n^{pred} = 2 \cdot V_{n-1} - V_{n-2}$, where $V_{n-1}$, $V_{n-2}$ are taken from step (A) on previous and pre-previous clock cycles, respectively.

21. The method of claim 15, wherein, in step (B), $V_n^{pred} = \tilde{V}_{n-1} + \tilde{\dot{V}}_{n-1} \cdot \tau$, where $\tilde{V}_{n-1}$, $\tilde{\dot{V}}_{n-1}$ are smoothed estimates of the absolute value of the velocity vector and its first derivative, respectively, from a previous clock cycle.

\* \* \* \* \*